United States Patent [19]

Papetti et al.

[11] Patent Number: 5,199,042
[45] Date of Patent: Mar. 30, 1993

[54] UNSTABLE LASER APPARATUS

[75] Inventors: Thomas Papetti, Huntsville, Ala.;
Gregory A. Witt, Apopka, Fla.;
Steven Strauch, Ellicott City, Md.;
Ron Selleck, Winter Park, Fla.

[73] Assignee: Litton Systems, Inc., Little Falls, N.J.

[21] Appl. No.: 818,834

[22] Filed: Jan. 10, 1992

[51] Int. Cl.$^5$ ............................................. H01S 3/08
[52] U.S. Cl. ..................................... 372/95; 372/108;
372/101; 372/106; 372/105; 372/100
[58] Field of Search ............... 372/108, 105, 101, 106,
372/92, 100, 95

[56] References Cited

U.S. PATENT DOCUMENTS 4,461,009 7/1984 Lundstrom .......................... 372/108
4,698,816 10/1987 Chun ................................... 372/101

Primary Examiner—Léon Scott, Jr.
Attorney, Agent, or Firm—William M. Hobby, III

[57] ABSTRACT

An unstable laser with improved beam quality has a laser medium and a pair of crossed Porro prism end reflectors positioned to form a resonator defining a light path through the laser medium. Beam expansion optics magnify the beam with each pass through the resonator and is accomplished with a negative lens at one end of the resonator and a telescope at the other end. The negative lens produces a diverging beam through a laser medium in one direction and the telescope recollimates the beam in the reverse direction. Radially varying birefringent compensation is accomplished in the resonator with a crystalline waveplate. Output coupling is achieved through the use of the waveplate in conjunction with polarizer optics.

7 Claims, 2 Drawing Sheets

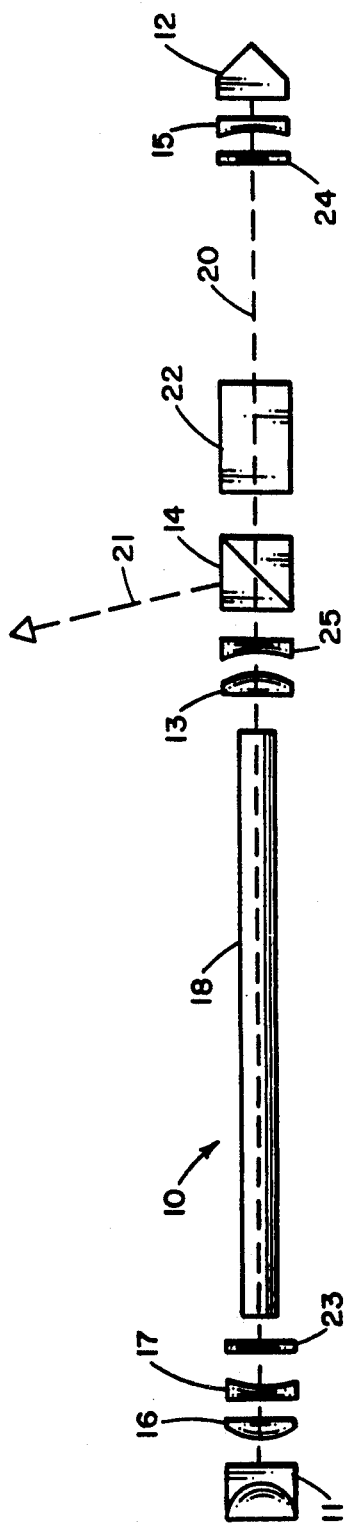
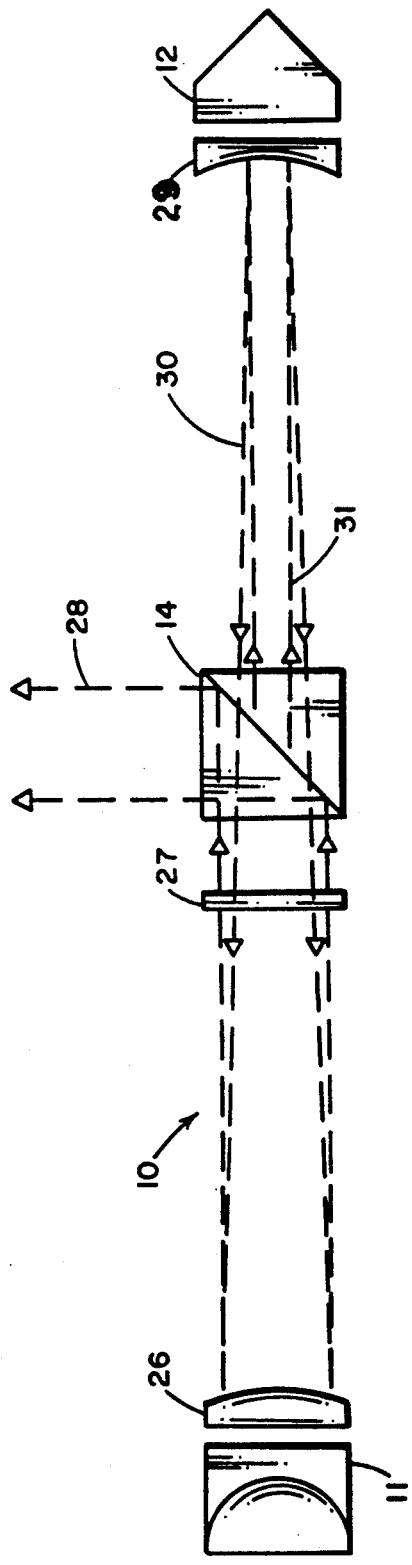

UNSTABLE LASER APPARATUS

BACKGROUND OF THE INVENTION

The present invention relates to lasers and especially to an unstable laser resonator using crossed Porro prism end reflectors and radially graded output reflectivity.

The fundamental components of a laser are a resonator, a laser medium, and an output coupling mechanism. A laser resonator basically consists of two resonator reflectors between which light travels back and forth. The region between the two reflectors is termed the resonator cavity. A laser gain medium within the cavity amplifies the light as it repeatedly traverses the cavity.

A stable resonator maintains the light beam to a limited diameter as it bounces back and forth, represented by closed ray paths between the resonator reflectors. Most commonly, the output beam is extracted from the resonator cavity by making one of the resonator reflectives partially transmissive. Stable resonator lasers are known for their ability to produce a light beam having good collimation and spatial coherence and having good "beam quality". However, because of the limited diameter of the beam, modest resonator lengths available in practical lasers, diffraction effects, and requirement for ray paths to be closed within a stable resonator, it is difficult to achieve simultaneously high-efficiency and diffraction-limited performance from a stable resonator laser.

An unstable resonator progressively increases the diameter of the light beam as it bounces back and forth between the two resonator reflectors. The portion of the beam whose diameter exceeds a certain value is generally extracted to form the output beam. Typical extraction techniques include deflecting the output beam away from the axis of the resonator cavity by an annular "scraper mirror" oriented at an angle to the axis, or else allowing the output beam to escape the cavity when its diameter exceeds that of one of the resonator reflectors. Unstable resonators do not impose requirements for closed ray paths, and are able to achieve excellent beam divergence while extracting energy efficiently from large gain volumes.

Lasers with low beam divergence and good beam quality, high efficiency, uniform beam profiles, and high reliability are required in industrial and military applications. Intrinsically low beam divergence or weak spreading of the laser beam is needed in order to strongly illuminate objects at large distances. Earlier stable resonator designs incorporated bulky, massive expansion telescopes at the output of the oscillator in order to reduce the beam divergence to an acceptable level. Unstable resonators have the desirable attributes of low divergence and high energy extraction efficiency. However, prior unstable resonator designs have not used alignment insensitive Porro prism end reflectors which greatly increase reliability of the system. In addition, they have not compensated for induced radial birefringence in the laser medium. Uncompensated birefrigence can result in low output energy, highly distorted spatial profiles, and damage in polarization coupled lasers.

Improved output characteristics using birefringence compensation and improved alignment stability with Porro prism end mirrors in stable polarization coupled resonators has been demonstrated in the past. However, stable resonators must trade off between efficiency, low beam divergence and good beam quality. A stable oscillator can operate with good energy extraction efficiency by allowing higher modes to exist. These same higher order modes however propagate at a much greater divergence. If the higher order modes are blocked to achieve low beam divergence, energy efficiency suffers. Unstable resonators inherently select the lowest divergence mode, even though the beam diameter in the laser medium is large. Thus, unstable resonators have an advantage over stable resonators in that they can be efficient and have low divergence.

Compared to "flat" mirrors, cross Porro prism end reflectors are made more insensitive to misalignment improving the reliability of the laser system. A crossed Porro prism resonator in a stable resonator is shown in U.S. Pat. No. 3,924,201 assigned to Applicant. In addition, techniques have been reported to compensate for thermally induced birefrigence in the gain media which require at least one Porro prism end reflector in a stable resonator. The present invention combines the best attributes of crossed Porro resonators employing birefrigence compensation with that of low magnification unstable resonators to achieve low beam divergence and high efficiency in an environmentally insensitive package.

Prior art unstable resonators or lasers can be seen in the Hoffmann, U.S. Pat. No. 4,491,950, for an unstable laser resonator having two spherical members and in the Pepper et al. patent, U.S. Pat. 4,803,696 for a laser with a grating feedback unstable resonator and in U.S. Pat. No. 4,787,092 to Gobbi et al. for a laser utilizing a negative branch unstable resonator. In the Trageser patent, U.S. Pat. No. 4,633,479, an alignment system for a confocal unstable laser resonator is shown while in the Morton, U.S. Pat. No. 4,423,511, an unstable waveguide laser resonator is shown. Other unstable laser resonators can be seen in the Komine et al. patent, U.S. Pat. No. 4,490,823, for injection of an unstable laser and in the Smith patent, U.S. Pat. No. 4,433,418, for an off-axis astigmatic unstable laser resonator. Birefringent plates for stabilization can be seen in the U.S. Pat. to Goodwin, 3,588,738, for a frequency stabilized laser and in the Lundstrom patent, U.S. Pat. No. 4,408,334, for a waveplate for correcting thermally induced stressed birefrigence in solid state lasers and in the Johnson, et al. patent, U.S. Pat. No. 4,935,932, for an apparatus using induced birefrigence to improve laser beam quality. These patents dealing with birefrigence as well as Applicant's prior patent using two Porro prism end reflectors are for stable resonators.

In contrast to these prior patents, the present invention deals with an unstable laser resonator which incorporates crossed Porro end reflectors for angular stability, birefringent compensation for improved beam uniformity, and a radially graded output coupling reflectivity used in conjunction with a polarizer to produce improved beam quality. The present method for producing the graded output coupling reflectivity is by incorporating a lens shaped waveplate. This combination results in a near diffraction limited output beam in which the efficiency is comparable to that of a conventional multimode laser having a many times diffraction limited output.

SUMMARY OF THE INVENTION

A laser with improved beam quality is composed of a laser medium optically placed between a pair of crossed Porro prism end reflectors which forms a resonator that defines a light path through the laser medium. A polarizer positioned within the resonator, in conjunction with various waveplates and any folding optics present that control the polarization state of the beam throughout the resonator, provides output coupling and functionally divides the resonator into two portions. One portion contains a net negative optical power, while the other portion contains a net positive optical power. The combination causes the circulating resonant beam to repeatedly expand on each pass giving it a defining characteristic of an unstable resonator. In the laser medium (gain) portion of the resonator, between the gain medium and the Porro end prism, a device is used that, in conjunction with the Porro prism, compensates for any radially symmetric birefrigence that exist within the gain medium. Also in this portion of the resonator, located between the gain medium and the polarizer, a device is used that establishes a radially varying polarization state across the beam when incident on the polarizer. This produces a radial dependent transmission/reflection of the beam as it passes through the polarizer. The radial variation in reflectivity causes a reduction in beam size as the beam passes through the polarizer, which compensates for the expansion of the beam incurred throughout the rest of the resonator. In the non-gain portion of the resonator, a Q-switching device is located between the polarizer and its Porro prism and allows rapid, dramatic changes in the optical losses incurred as the propagating beam circulates through the resonator. This combination results in a near diffraction limited output beam in which the efficiency is comparable to that of a conventional multimode laser having a many times diffraction limited output.

BRIEF DESCRIPTION OF THE DRAWINGS

Other objects, features, and advantages of the present invention will be apparent from the written description and the drawings in which:

FIG. 1 is a schematic diagram of a functioning graded reflectivity unstable laser resonator in accordance with the present invention;

FIG. 2 is an optical representation of a simplified graded reflectivity unstable laser resonator.

DESCRIPTION OF THE PREFERRED EMBODIMENT

Figure 3:
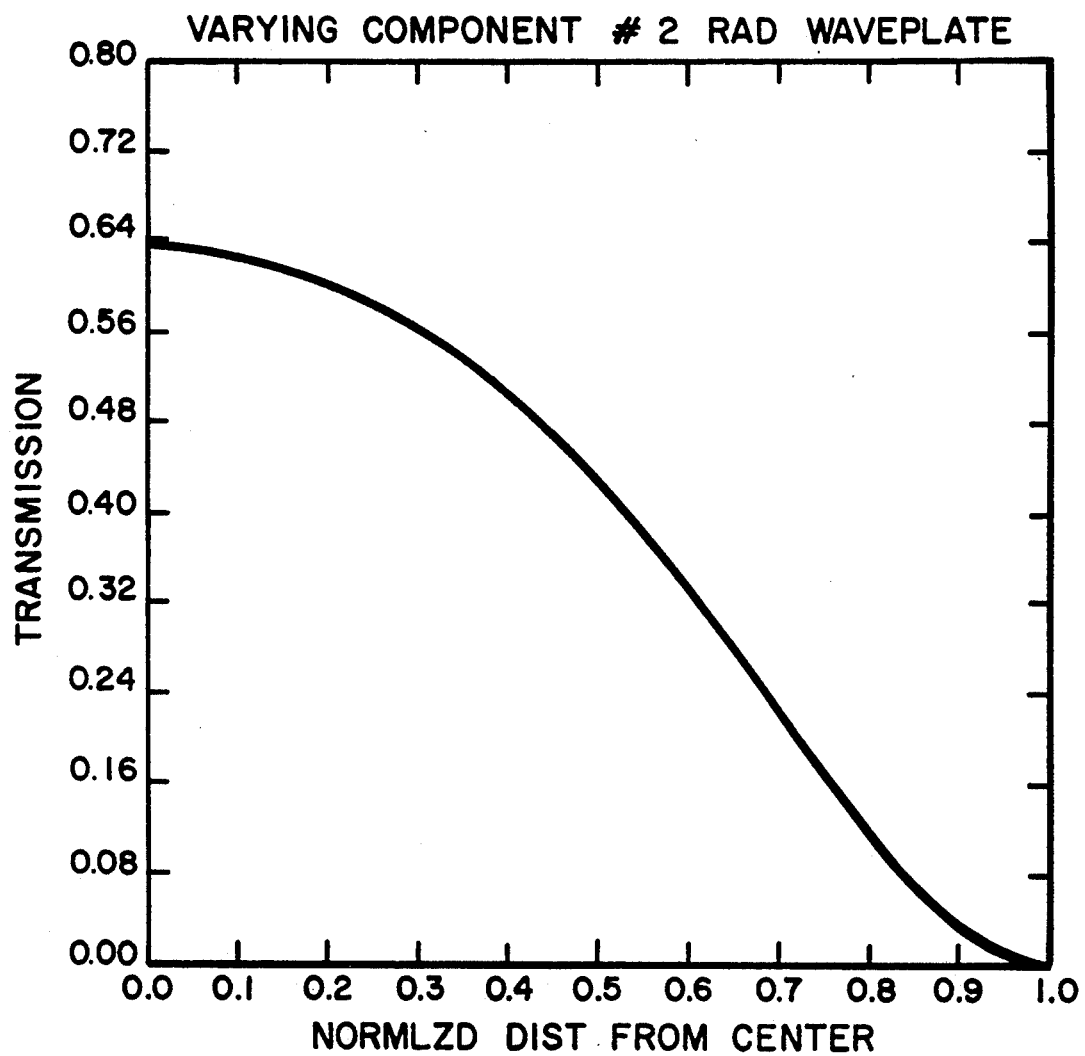
FIG. 3 is a plot diagram of the theoretical output coupling reflectivity as a function of the curved waveplate radius.

A schematic of a resonator in accordance with the present invention is shown in FIG. 1. The resonator length is defined by crossed Porro prisms 11 and 12 and output coupling is achieved through the use of a radially graded waveplate 13 and a polarizer 14. The beam is magnified with each pass through the resonator. The magnification is accomplished with a negative lens 15 at one end of the resonator 10 and a compensation telescope 16 and 17 which allows for adjustability at the other end. The overall magnification in the resonator is kept small to permit efficient energy extraction from the laser medium 18. The negative lens 15 produces a diverging beam through the laser medium 18 in one direction and the telescope 16 and 17 recollimates the beam 20 in the reverse direction. The beam propagation through the resonator is illustrated in FIG. 2. When the collimated beam impinges on the polarizer 14, the edges of the beam are completely reflected out of the laser to form the output 21, while the center part of the beam is partially transmitted.

In FIG. 2 a simplified graded reflectivity unstable resonator is represented having crossed Porro prisms 11 and 12 orientated 90° with respect to one another. The representation is shown without the laser medium 18 and shows the polarizer 14 producing the output 28. The unstable resonator shown in FIG. 2 is established by the positive element 26 located near Porro prism 11 and the negative element 29 is positioned adjacent the Porro prism 12. The positive and negative elements described are not held to one component each and could easily incorporate several components to achieve the optical propagation required. In this schematic, the propagation of beam 30 is seen to be expanding as a result of passing through the negative element 29 while the returning beam 31 has been recollimated by the positive element 26 passing the opposite direction. Output coupling 28 from the resonator is accomplished by combining the attributes of the radially varying birefringent element 27 and the polarizer 14, which is described in the following paragraph.

The radial variation in out-coupling is accomplished with a crystalline waveplate 13 (FIG. 1) which is shaped like a positive lens. The retardation of the waveplate varies radially from the center since the retardation is dependent on the material thickness. As a result, the polarization emerging from the waveplate will vary radially across the beam. The central retardance of the waveplate is chosen so that when the beam reaches the polarizer 14, the center of the beam contains both S and P polarization components. Since only the S polarized component of the beam is reflected by the polarizer 14, partial out-coupling creates the output 21. A compensating lens 25 is used here to negate the lensing effects of lens shaped waveplate 13.

FIG. 3 is a plot of the theoretical output coupling reflectivity as a function of radius for a waveplate with a spherical radius of curvature. In the demonstrated unstable laser resonator, the central thickness of the curved waveplate is such that the total net retardation in the center is 0.25 waves. This allows for total adjustability of the central reflectivity of the graded reflectivity. The radius of curvature of the waveplate is selected to create an internal mode size large enough to efficiently fill the laser medium 18 aperture.

In FIG. 1, the negative lens 25 possesses the same focal length, except in sign, as the lens shaped waveplate and is used to cancel the optical power of the waveplate. Therefore, the curved waveplate in combination with the negative lens 25 functions as an intracavity telescope with a magnification near unity.

A waveplate 23 is used between the Porro prism 11 and the laser medium 18 to compensate for induced birefrigence in the laser medium 18. A separate waveplate 24 is located between the Pockels cell 22 and the Porro prism 12 to establish 100% loss before Q-switching. An LiNbO$_3$ Pockels cell 22 is used for Q-switching the laser resonator.

A functionally demonstrated unstable laser resonator has been illustrated here which incorporates crossed Porro prism end reflectors for alignment sensitivity along with birefringent compensation for improved beam uniformity. Polarization output coupling utilizes a low magnification expansion telescope and a lens shaped waveplate optically coupled with a polarizer to produce a radially graded output coupling reflectivity for improved beam quality. The present invention is not to be considered as limited to the forms shown which are to be considered illustrative rather than restrictive. Additional optics may be used to manipulate the resonator geometry and to control the polarization state throughout the resonator. In addition, further optics may be included to compensate for thermal effects. However, several of the existing components could be integrated together to achieve the same desired function in an unstable laser resonator. For instance, the telescope consisting of the lens shaped waveplate 13 and a negative lens 25 could adequately function as the resonator positive element. Therefore, in FIG. 1 the telescope elements 16 and 17 at the end of the rod portion of the resonator could be eliminated.

We claim:

1. An unstable laser with improved beam quality comprising:
    a laser medium;
    a pair of crossed Porro prism and reflectors positioned to form a resonator defining a light path through said laser medium;
    beam expansion means located in said light path between said pair of crossed Porro prism end reflectors for magnifying said light beams passing therethrough in one direction to form an unstable laser resonator, said beam expansion means including a negative element having a negative spherical power;
    a radially varying birefrigent member positioned in said light path between said crossed Porro prisms;
    recollimation optic means for recollimation of said light beam for said beam expansion means in a second direction, said recollimating optic means includes a positive component having a net positive spherical power; and
    polarizer means located in said light path for reflecting a portion of said light beam from said light path to form an output light beam, whereby a near diffraction limited output beam is accomplished with an unstable laser.

2. An unstable laser with improved beam quality in accordance with claim 1 in which said recollimating optic means is located in the laser medium portion of said laser resonator and said beam expansion means negative element is located at one end of the said laser resonator.

3. An unstable laser with improved beam quality in accordance with claim 1 in which said radially varying birefringent member includes a crystalline waveplate.

4. An unstable laser with improved beam quality in accordance with claim 3 in which said radially varying birefringent member includes a plurality of crystalline waveplate.

5. An unstable laser with improved beam quality in accordance with claim 4 in which said crystalline waveplate varies radially from the center thereof to form positive or negative lens shape whereby the polarization emerging from the waveplate varies radially across the beam.

6. An unstable laser with improved beam quality in accordance with claim 4 in which said crystalline waveplate has a radius of curvature that in conjunction with the beam expansion optics sets the resonating beam size.

7. An unstable laser with improved beam quality in accordance with claim 1 in which said unstable resonator has a Q-switching device located in the resonator opposite the laser medium and separated by said polarizer.

* * * * *